US009873096B2

(12) United States Patent
De et al.

(10) Patent No.: US 9,873,096 B2
(45) Date of Patent: Jan. 23, 2018

(54) FEED NOZZLE ASSEMBLY

(75) Inventors: Bidyut De, Faridabad (IN); Pankaj Kumar Kasliwal, Faridabad (IN); Debasis Bhattacharyya, Faridabad (IN); Venkatachalam Krishnan, Faridabad (IN); Santanam Rajagopal, Faridabad (IN)

(73) Assignee: INDIAN OIL CORPORATION LIMITED, Faridabad (IN)

( * ) Notice: Subject to any disclaimer, the term of this patent is extended or adjusted under 35 U.S.C. 154(b) by 645 days.

(21) Appl. No.: 13/519,140

(22) PCT Filed: Dec. 3, 2010

(86) PCT No.: PCT/IN2010/000786
§ 371 (c)(1),
(2), (4) Date: Jun. 26, 2012

(87) PCT Pub. No.: WO2011/080754
PCT Pub. Date: Jul. 7, 2011

(65) Prior Publication Data
US 2012/0302805 A1     Nov. 29, 2012

(30) Foreign Application Priority Data
Dec. 29, 2009  (IN) .......................... 2721/DEL/2009

(51) Int. Cl.
*B01F 5/02*     (2006.01)
*B01J 4/00*     (2006.01)
(52) U.S. Cl.
CPC ............. *B01F 5/0256* (2013.01); *B01J 4/002* (2013.01)

(58) Field of Classification Search
CPC ................................ B01J 4/002; B01F 5/0256
USPC .... 239/589, 310, 398, 427, 427.3, 429, 432, 239/433, 434
See application file for complete search history.

(56) References Cited

U.S. PATENT DOCUMENTS

| 733,579 | A | * | 7/1903 | Fitton | 239/424 |
|---|---|---|---|---|---|
| 1,427,910 | A | * | 9/1922 | Quinn | 239/405 |
| 2,630,183 | A | * | 3/1953 | Foutz | 169/15 |
| 2,774,583 | A | * | 12/1956 | Haftke | A62C 31/005 169/15 |
| 2,985,517 | A | * | 5/1961 | Harper | B01J 8/1818 208/164 |
| 3,272,441 | A | * | 9/1966 | Davis, Sr. et al. | 239/403 |
| 3,477,644 | A | * | 11/1969 | Bablouzian et al. | 239/135 |
| 3,684,188 | A | * | 8/1972 | Miller | E04F 21/12 239/422 |

(Continued)

*Primary Examiner* — Arthur O Hall
*Assistant Examiner* — Steven M Cernoch
(74) *Attorney, Agent, or Firm* — Maschoff Brennan (57) ABSTRACT

The present subject matter relates to a feed nozzle assembly 100 for atomizing a heavy hydrocarbon feed by mixing the hydrocarbon feed with a diluent and an atomizing media. The feed nozzle assembly 100 includes at least one primary mixing chambers 101 for receiving the liquid hydrocarbon feed and the diluent to create a primary mixture. The primary mixture is than forwarded to a secondary mixing chamber 102. The secondary mixing chamber extends to a tertiary mixing chamber 103. A steam inlet 110 is provided to inject streams of steam to the secondary mixing chamber 102 and to the tertiary mixing chamber 103 through a first opening and a second opening, respectively, located within the steam inlet 110.

6 Claims, 6 Drawing Sheets

(56) References Cited

U.S. PATENT DOCUMENTS

| | | | | |
|---|---|---|---|---|
| 4,097,243 A * | 6/1978 | Bartholic | | B01J 8/0278 208/113 |
| 4,314,670 A * | 2/1982 | Walsh, Jr. | | B05B 7/0416 239/11 |
| 4,349,156 A * | 9/1982 | Haruch et al. | | 239/432 |
| 4,584,147 A * | 4/1986 | Stehning | | 261/115 |
| 4,687,642 A * | 8/1987 | Nielsen | | C10G 11/18 208/127 |
| 4,795,547 A * | 1/1989 | Barnes | | B01F 3/12 208/113 |
| 4,809,911 A * | 3/1989 | Ryan | | B05B 7/04 239/124 |
| 4,815,665 A * | 3/1989 | Haruch | | 239/432 |
| 4,915,300 A * | 4/1990 | Ryan | | A62C 5/02 239/267 |
| 4,989,788 A * | 2/1991 | Bendig et al. | | 239/429 |
| 5,176,325 A * | 1/1993 | Vidusek | | 239/419.3 |
| 5,188,296 A * | 2/1993 | Duez et al. | | 239/403 |
| 5,271,562 A * | 12/1993 | Myers et al. | | 239/290 |
| 5,372,312 A * | 12/1994 | Vidusek | | 239/419.3 |
| 5,484,107 A * | 1/1996 | Holmes | | B05B 7/0408 239/427.5 |
| 5,553,783 A * | 9/1996 | Slavas et al. | | 239/403 |
| 5,553,785 A * | 9/1996 | Haruch | | 239/432 |
| 5,603,453 A * | 2/1997 | Weaver et al. | | 239/8 |
| 5,639,024 A * | 6/1997 | Mueller | | B05B 7/0408 239/419.3 |
| 5,673,859 A * | 10/1997 | Haruch | | 239/568 |
| 5,679,135 A * | 10/1997 | Carl | | B05B 7/065 95/149 |
| 5,692,682 A * | 12/1997 | Soule | | 239/403 |
| 5,779,159 A * | 7/1998 | Williams | | A62C 31/12 239/424.5 |
| 5,810,252 A * | 9/1998 | Pennamen | | B05B 7/0441 239/423 |
| 5,899,387 A * | 5/1999 | Haruch | | 239/296 |
| 6,056,208 A * | 5/2000 | Pirker et al. | | 239/119 |
| 6,093,310 A * | 7/2000 | Swan | | C10G 11/18 208/113 |
| 6,098,896 A * | 8/2000 | Haruch | | 239/8 |
| 6,158,672 A * | 12/2000 | Millan | | B05B 7/0081 239/290 |
| 6,161,778 A * | 12/2000 | Haruch | | 239/290 |
| 6,179,997 B1 * | 1/2001 | Vedder et al. | | 208/113 |
| 6,299,343 B1 * | 10/2001 | Pekerman | | B01F 5/0426 137/3 |
| 6,328,226 B1 * | 12/2001 | Goenka | | B05B 7/0075 239/290 |
| 6,352,639 B2 * | 3/2002 | Ito | | F28F 7/02 208/113 |
| 6,523,991 B1 * | 2/2003 | Maklad | | B01F 5/0403 137/889 |
| 6,662,549 B2 * | 12/2003 | Burns | | B63H 11/02 60/204 |
| 6,736,960 B1 * | 5/2004 | Chen | | B01J 8/1827 208/113 |
| 6,902,707 B2 * | 6/2005 | Adamson | | B01F 3/04049 239/450 |
| 6,916,416 B2 * | 7/2005 | Adamson et al. | | 208/113 |
| 7,644,871 B2 * | 1/2010 | Ramanan | | H01L 21/67126 228/33 |
| 7,674,449 B2 * | 3/2010 | Randolph et al. | | 423/522 |
| 7,967,221 B2 * | 6/2011 | Snyder | | B05B 7/0416 239/418 |
| 8,322,633 B2 * | 12/2012 | Hubert et al. | | 239/418 |
| 8,820,663 B2 * | 9/2014 | Vidusek et al. | | 239/434 |
| 9,004,375 B2 * | 4/2015 | Fenton | | A62C 31/02 239/11 |
| 9,010,663 B2 * | 4/2015 | Fenton | | A62C 5/002 239/418 |
| 2002/0153428 A1 * | 10/2002 | Koveal et al. | | 239/11 |
| 2002/0162518 A1 * | 11/2002 | Dumaz | | F04F 5/461 122/404 |
| 2004/0251320 A1 * | 12/2004 | Koponen | | 239/434.5 |
| 2006/0102749 A1 * | 5/2006 | Crabtree | | A62C 31/02 239/410 |
| 2007/0210186 A1 * | 9/2007 | Fenton | | A62C 5/002 239/422 |
| 2008/0230632 A1 * | 9/2008 | Fenton | | A62C 31/02 239/433 |
| 2009/0121038 A1 * | 5/2009 | Wurz | | 239/8 |
| 2009/0240088 A1 * | 9/2009 | Fenton | | B01F 3/1214 568/840 |

\* cited by examiner

Fig 6b

FEED NOZZLE ASSEMBLY

TECHNICAL FIELD

The present subject matter, in general, relates to an atomization process for a liquid hydrocarbon and in particular relates to a feed nozzle assembly for the achievement of the atomization process.

BACKGROUND

Fluid catalytic cracking (FCC) is employed in petroleum refineries to convert high-boiling hydrocarbon fractions of crude oil to more valuable products like gasoline, Liquefied Petroleum Gas (LPG), and diesel. For this, heavy crude oil is chemically broken down into lighter hydrocarbon fractions having comparatively smaller chain of carbon atoms with the help of one or more catalysts. These high boiling hydrocarbons fractions are then introduced, in multiple streams, into a riser reactor section to undergo catalytic cracking. This results in lighter hydrocarbon fractions, which may be further sent to a fractional distillation column for extracting aforementioned valuable products.

As the FCC is the prime factor that governs quantity as well as quality of the final yield of any refinery, the time consumed by a FCC unit greatly influences the overall rate of production. To minimize time involved in catalytic cracking, a liquid hydrocarbon stream is vaporized inside the riser reactor to get completely diffused into the pores of the catalyst(s) used. To facilitate this vaporization process, the liquid hydrocarbon stream or the hydrocarbon feed is first atomized.

The atomization process, conducted in an atomizer, refers to the breaking down of a hydrocarbon feed of a given volume into a number of fine droplets to expand surface area or the hydrocarbon feed with respect to its own initial volume. An' expanded surface area enhances the ease of vaporization. Also, the hydrocarbon feed is subjected to a high temperature during the atomization process which alters certain physical parameters, such as viscosity. This further enhances atomization of the hydrocarbon feed.

Conventional atomizers employed to atomize the hydrocarbon feed mix the hydrocarbon feed with steam, and the mixture so formed is routed through a nozzle orifice of the atomizer. This mixing with steam leads to division of the hydrocarbon feed into fine droplets and dispersion of these fine droplets into the steam.

However, the conventional atomizers fall short in completely and efficiently atomizing a heavy hydrocarbon feed that is extremely viscous and has a very high surface tension. Inefficient atomization leads to non-uniformity in terms of diameter and velocity of the droplets of the atomized hydrocarbon feed. Moreover, it takes considerable time for such hydrocarbon feeds to vaporize. Delayed vaporization of the hydrocarbon feed in turn leads to slow and inadequate absorption of heat by the hydrocarbon droplets inside the riser reactor, thus leading to undesirable thermal cracking and excessive production of byproducts such as coke.

SUMMARY

The present subject matter describes a feed nozzle assembly for atomizing a liquid hydrocarbon feed. The feed nozzle assembly includes at least one primary mixing chamber to receive a liquid hydrocarbon feed and a diluent for producing a primary mixture. A secondary mixing chamber is flow connected to the primary mixing chamber to receive the primary mixture. In addition, the secondary mixing chamber extends to a tertiary mixture chamber. Further, a steam inlet is provided 10 inject streams of steam to the secondary mixing chamber and to the tertiary mixing chamber through a first opening and a second opening, respectively, located within the steam inlet.

The feed nozzle assembly described by the present subject matter atomizes all forms of the liquid hydrocarbon feed that have high viscosity and surface tension. In addition, the present feed nozzle assembly prevents a requirement of highly pressurized liquid hydrocarbon supply.

These and other features, aspects, and advantages of the present subject matter will be better understood with reference to the following description and appended claims. This summary is provided to introduce a selection of concepts in a simplified form. This summary is not intended to identify key features or essential features of the claimed subject matter, nor is it intended to be used to\ limit the scope of the claimed subject matter.

BRIEF DESCRIPTION OF DRAWINGS

Fig. I illustrates a schematic view of a feed nozzle assembly, in one embodiment of the present subject matter.

DETAILED DESCRIPTION

The present subject matter describes a feed nozzle assembly for atomizing a liquid hydrocarbon feed and directing the feed to emerge out of the feed nozzle assembly in the form of a flat fan spray. The atomization of the liquid hydrocarbon feed is performed within the assembly by mixing the feed with at least one diluent and at least one atomizing media at various stages. This mixing is achieved in different chambers corresponding to the various stages.

As known in the existing art, the diluent generally includes nitrogen gas, fuel gas, sub cooled water, and various streams of naphtha, such as coker naphtha, straight run naphtha, visbreaker naphtha, and so on. The present subject matter employs partially vaporized subcooled water as the diluent and steam as the atomizing media. The mixing at different stages of atomization leads to adequately atomized hydrocarbon droplets.

During a first stage of mixing, the liquid hydrocarbon feed is mixed with partially vaporized sub-cooled water in a primary mixing chamber to give rise to a primary mixture of the liquid hydrocarbon feed and steam. By the effect of temperature and pressure differential that exists between the hydrocarbon feed and the sub-cooled water, the sub-cooled water vaporizes vigorously and gets mixed in the liquid hydrocarbon to form the primary mixture. The primary mixture is a two phase mixture of the liquid hydrocarbon feed and steam.

Further, the primary mixture of the primary mixing chambers is introduced In a secondary mixing chamber through a contraction zone. The passage through this contraction zone pressurizes the primary mixture to compensate for a pressure loss suffered by the primary mixture while expansion in the primary mixing chambers. In the secondary mixing chamber, the primary mixture is mixed with streams of steam to atomize the primary mixture to produce a secondary mixture. The secondary mixture so obtained gets pressurized due to the pressure of the further arriving stream of the steam and flows into the tertiary mixing chamber connected to the secondary mixing chamber.

In the tertiary mixing chamber, the secondary mixture undergoes mixing with the streams of steam and gets further atomized. This mixing leads to the formation of a tertiary mixture. Due to repetitive atomization, this tertiary mixture shows considerably lower viscosity and surface tension than the liquid hydrocarbon feed that was originally fed into the feed nozzle assembly.

Furthermore, the tertiary mixture is divided into a number of streams by a flow diverter located within the tertiary mixing chamber of the feed nozzle assembly. The flow diverter diverts the streams of the tertiary mixture to at least one nozzle orifice which may be located within a nozzle tip region that acts as an extension of the tertiary mixing chamber. Finally, the different divided streams of the tertiary mixture are individually atomized as they pass through the nozzle orifice. These tertiary mixture streams emerge out of the nozzle orifice in the form of a flat fan spray of liquid hydrocarbon droplets.

The present nozzle assembly efficiently atomizes any liquid hydrocarbon feed into fine droplets irrespective of the physical state of the feed. In addition, the feed nozzle assembly maintains a low pressure drop across all the sections of the feed nozzle assembly. Accordingly, a medium pressurized supply of the liquid hydrocarbon feed is required by the feed nozzle assembly at the input.

Figure 1:
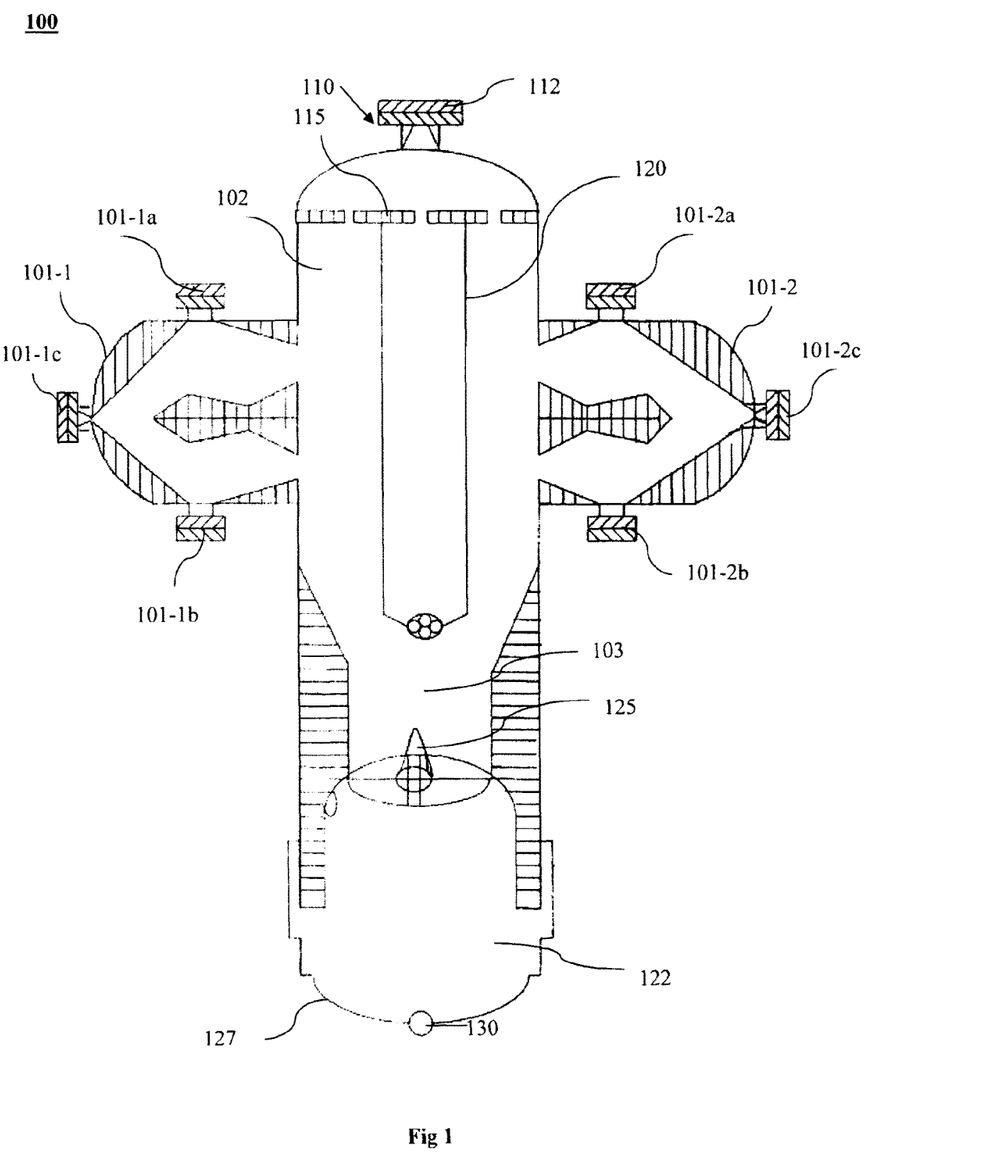

FIG. 1 illustrates a schematic view of a feed nozzle assembly 100, in accordance with one embodiment of the present subject matter. As shown in Fig I, the feed nozzle assembly includes a pair of primary mixing chambers 101-1 and 101-2, collectively referred to as primary mixing chambers 101; a secondary mixing chamber 102; and a tertiary mixing chamber 103.

In operation, a pre-heated hydrocarbon feed at low pressure is introduced into the primary mixing chambers 101 through at least four hydrocarbon feed inlet orifices 101-1$a$, 101-1$b$, 101-2$a$ and 101-2$b$. In one embodiment, the hydrocarbon feed inlet orifices 101-1$a$, 101-1$b$, 101-2$a$ and 101-2$b$ may be disposed at an angle of 90 degrees with respect to the primary mixing chambers 101. However, the primary mixing chambers 101 may also include more than four hydrocarbon feed inlets that may be disposed at angles other than 90 degrees with respect to the primary mixing chamber 101.

Further, a diluent at a high velocity is introduced into the primary mixing chambers 101. Specifically, the diluent is injected inside the primary mixing chambers 101 through at least two inlet orifices 101-1$c$ and 101-2$e$. The inlet orifices IOI-Ie and 101-2$e$ may be in the form of convergent-divergent nozzle, however, other types of orifices are also possible. In one implementation, the diluent is a partially vaporized sub-cooled water.

The diluents, i.e., sub-cooled water, injected inside the primary mixing chambers 101 has a lower temperature and a higher pressure as compared to the liquid hydrocarbon feed, which is pre-heated and pressurized, as mentioned earlier. The pressure and temperature differential between the diluent and the liquid hydrocarbon feed facilitates vigorous mixing of the diluent into the liquid hydrocarbon feed. The diluent may be interchangeably referred to as sub-cooled water, hereinafter.

Accordingly the sub-cooled water vaporizes into steam and gets mixed with the hydrocarbon feed. Accordingly, a two phase mixture of the liquid hydrocarbon and steam, hereinafter referred to as primary mixture, is formed within the primary mixing chambers 101.

The primary mixture from both the primary mixing chambers 101-1 and 101-2 enters into the secondary mixing chamber 102 at a high speed. In one embodiment, the secondary mixing chamber 102 and the two primary mixing chambers 101-1 and 101-2 are orthogonally aligned with each other. However, the two primary mixing chambers 101-1 and 101-2 may also be aligned at an angle between 30 degrees and 90 degrees with respect to the secondary mixing chamber 102. The presence of two primary mixing chambers 101 facilitate collision mixing of the primary mixture from both the primary mixing chambers 101 with each other in the secondary mixing chamber 102. Accordingly, the presence of more than one primary mixing chamber leads to enhanced mixing due to the collision.

Furthermore, in one embodiment of the present subject matter, there may be more than two primary mixing chambers 101. Such number of primary mixing chambers 101 may be flow connected substantially along a circumference of the secondary mixing chamber 102 at equal distance from one another.

A stream of steam at a higher pressure as compared to the pressure of the hydrocarbon feed is introduced into the feed nozzle assembly 100 from a steam inlet 110. For this purpose, the steam inlet 110 includes a perforated plate 115 disposed within the secondary mixing chamber 102. The perforated plate 115 divides the incoming stream of steam from a steam source 112 into a streams of steam. To dissect the incoming stream of steam, the perforated plate 115 includes a plurality of orifices. A first opening (shown in FIG. 3) is created by one or more orifices on the perforated plate 115. Similarly one or more orifices on the perforated plate 115 form a second opening (shown in FIG. 3).

The first opening provides the streams of steam into the secondary mixing chamber 102 for mixing with the primary mixture arrived from the primary mixing chambers 101. This mixing in the secondary mixing chamber 102 atomizes the liquid hydrocarbon feed present in the primary mixture in the presence of steam to create a secondary mixture inside the secondary mixing chamber 102. Side by side, the kinetic energy of the progressively coming streams of steam sweeps the secondary mixture into the tertiary mixing chamber 103 from the secondary mixing chamber 102.

While moving towards the tertiary mixing chamber 103, the secondary mixture encounters a constricted passage downstream of the secondary mixing chamber 102. Such constriction in the passage arises due to narrowing of inner walls of the feed nozzle assembly 100 and facilitates reduction in the volume of the secondary mixture, flowing through it to compensate for pressure losses as suffered by the liquid hydrocarbon feed while getting mixed with steam in the secondary mixing chamber 102. Due to increase in pressure, the secondary mixture entering into the tertiary mixing chamber 103 suffers a reduction in volume.

The secondary mixture of the secondary mixing chamber 102 undergoes collision mixing with the streams of steam delivered to the tertiary mixing chamber 103 by the second opening. The steam inlet 110 includes a cylindrical member 120 to transmit the streams of steam into the tertiary mixing chamber 103 from the second opening. As a result, further atomization of the liquid hydrocarbon feed takes place and a tertiary mixture of the liquid hydrocarbon feed and steam is obtained within the tertiary mixing chamber 103.

The tertiary mixture is the received by a nozzle tip region 122 which is included within the tertiary mixing chamber 103 and acts as an extension of the tertiary mixing chamber 103. In addition, a flow diverter 125 is disposed at the beginning of the nozzle tip region 122 within the tertiary mixing chamber 103. The flow diverter 125 receives the tertiary mixture and divides the tertiary mixture into a number of tertiary mixture streams. Each tertiary mixture stream is then diverted to at least one nozzle orifice 130. The nozzle orifice 130 is disposed at a boundary 127 of the nozzle tip region 122, thereby forming an outlet of the feed nozzle assembly 10'0. In one embodiment, there may be more than one nozzle orifice 130 within the nozzle tip region 122. Such a plurality of nozzle orifices 130 may be provided at different elevations within the nozzle tip region 122. The nozzle orifices 130 receive the tertiary mixture streams for individually atomizing the each tertiary mixture stream.

The nozzle orifice 130 facilitate emergence of the tertiary mixture streams out of the feed nozzle assembly 100 in the form of a flat fan shaped spray of droplets of the liquid hydrocarbon feed.

Figure 2A:
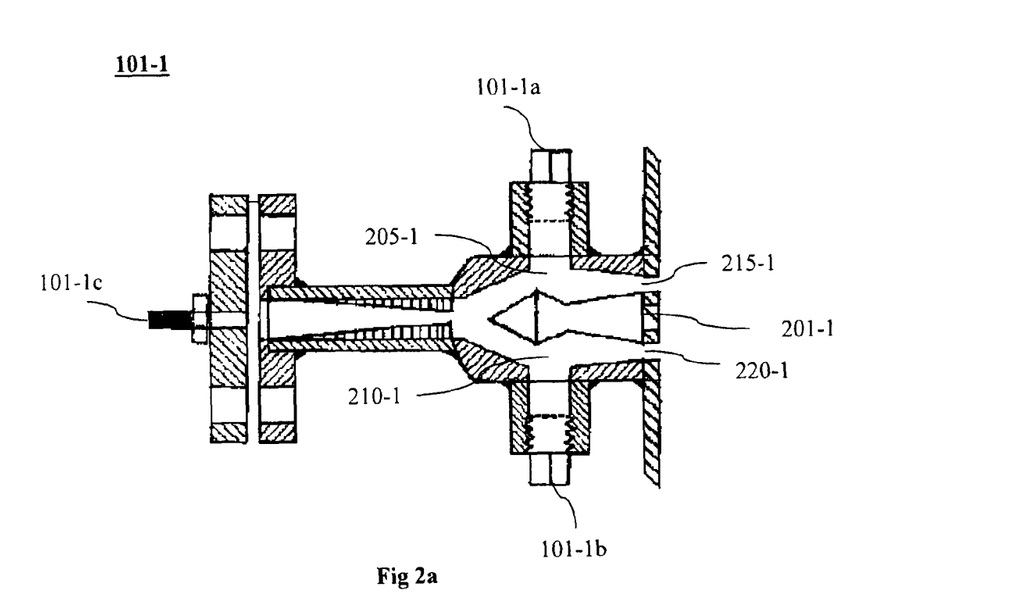
FIG. 2a and FIG. 2b illustrate a schematic view of a primary mixing chamber of the feed nozzle assembly of FIG. 1, in one embodiment of the present subject matter.
Figure 2B:
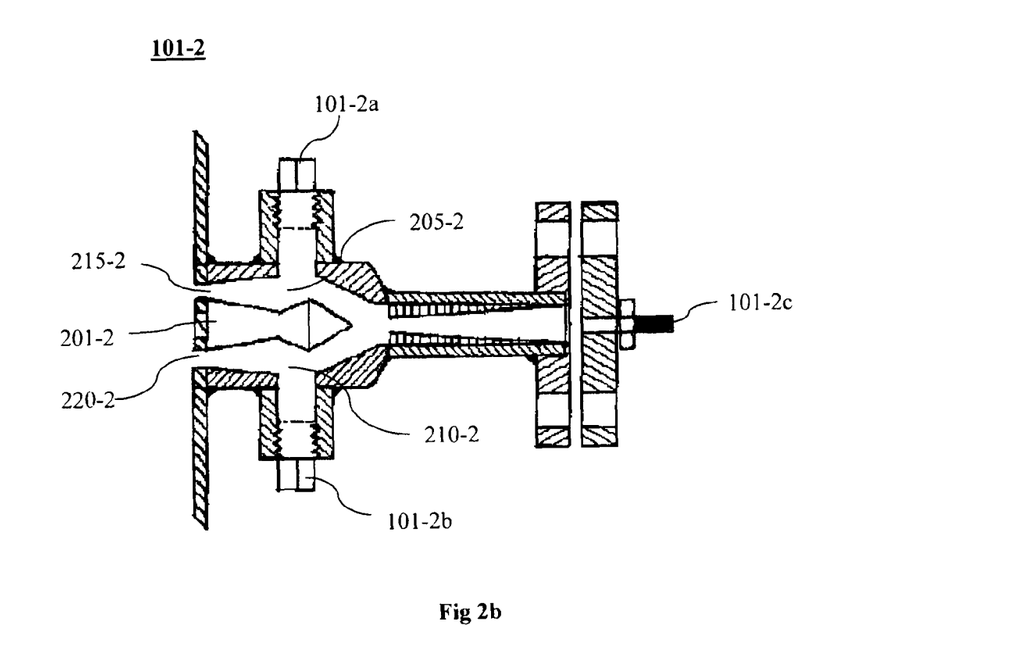

FIG. 2a and FIG. 2b illustrate a schematic view of the primary mixing chambers 101 of the feed nozzle assembly 100 of FIG. 1, in one embodiment of the present subject matter.

With reference to FIG. 1, the primary mixing chambers 101-1 and 101-2 depicted in FIG. 2a and FIG. 2b, respectively, are located opposite to each other. The primary mixing chambers 101-1 may also be referred as the first mixing chamber 101-1 and the primary mixing chamber 101-2 as the second mixing chamber 101-2. The structure as well as functionality of both the primary mixing chambers 101-1 and 101-2 is identical.

As shown in FIGS. 2a and 2b, the primary mixing chambers 101-1 and 101-2 include four hydrocarbon feed inlets 101-1a, 101-1b and 101-2a, 101-2b, two sub-cooled water inlets IOI-1e and 101-2e. and arrow shaped dividers 201-1 and 201-2. The dividers 201-1 and 201-2 divide each of the primary mixing chambers 101-1 and 101-2 into two chambers, namely, upper chamber and lower chamber. The structure of the dividers 201-1 and 201-2 within the primary mixing chambers 101-1 and 101-2 may be irregular or skewed. The two dividers 2011 and 201-2 may be collectively referred as the arrow shaped divider 201.

Specifically, the dividers 201-1 and 201-2 originate as narrow shaped at their middle portions and conclude as widely shaped at their ends. The wide shape of the dividers 101-1 and 101-2 at the ends is in the form of a sharp edge. Such sort of irregular surface of the dividers 201 results in the formation of expansion and contraction zones within the primary mixing chambers 101. In one implementation, the primary mixing chambers 101-1 and 101-2 have upper expansion zones 205-1 and 205-2, lower expansion zones 210-1 and 210-2, upper contraction zones 215-1 and 215-2, and lower contraction zones 220-1 and 220-2, respectively.

In operation, the liquid hydrocarbon feed at a high temperature and pressure is fed through the hydrocarbon feed inlets 101-1a, 101-1b, 101-2a and 101-2b into the upper chamber and the lower chamber of the primary mixing chambers 101-1 and 1(11-2. The liquid hydrocarbon feed strikes the dividers 202-1 and 201-2 in the primary mixing chambers 101-1 and 101-2 and gets divided into large size droplets within the upper and lower chambers therein.

The diluent i.e., the partially vaporized sub-cooled water, is fed through the subcooled water inlets 101-1e and 101-2e at higher pressure and lower temperature as compared to the pressure and temperature of the hydrocarbon feed. In one implementation, the subcooled water inlets 101-1e and 101-2e are in the form of a convergent-divergent nozzle, which facilitates feeding of the sub-cooled water streams into the feed nozzle assembly 100 in the form of a spray at a high velocity. On entering the primary mixing chambers 101, the subcooled water stream strikes the dividers 201-1 and 201-2 and gets split into two sub-cooled water streams. One of these sub-cooled water streams heads towards the upper chamber and another towards the lower chamber in both the primary mixing chambers 101.

The two sub-cooled water streams come into contact with the droplets of the liquid hydrocarbon feed present in the upper and the lower chambers of the primary mixing chambers 101-1 and 101-2. By virtue of an existence of a considerable pressure and temperature differential between the hydrocarbon feed and the partially vaporized sub-cooled water. the sub-cooled water vigorously mixes with the hydrocarbon feed and rapidly vaporizes into steam within the hydrocarbon feed.

In this manner, the sub-cooled water acts as a diluent for the droplets of the liquid hydrocarbon feed and facilitate atomization of the liquid hydrocarbon feed in the rest of the chambers of the feed nozzle assembly 100. The sub-cooled water vigorously mixes with the liquid hydrocarbon feed and shortens the size of the droplets and leads to the formation of a primary mixture within the upper and the lower chambers of the primary mixing chambers 10 I-I and 101-2. The primary mixture so formed includes a two phase mixture of the liquid hydrocarbon feed and steam. As the aforesaid mixing progresses with the introduction of more liquid hydrocarbon feed and the sub-cooled water, the volume of the primary mixture increases. This leads to expansion of the primary mixture in the upper expansion zones 205-1 and 205-2 and the lower expansion zones 210-1 and 210-2 of both the primary mixing chambers 101-1 and 101-2. As more and more mixing of the incoming hydrocarbon feed and the sub-cooled water takes place, an increasing concentration of the primary mixture within the primary mixing chambers 10 I forces the primary mixture from the upper expansion zones 205-1 and 205-2 and the lower expansion zones 210-1 and 210-2 into the secondary mixing chamber 102. This transportation of mixture takes place through the upper contraction zones 215-1 and 215-2 and the lower contraction zones 220-1 and 220-2.

Typically, the aforementioned contraction zones of the primary mixing chambers 101-1 and 101-2 act as gateway to the secondary mixing chamber 102 and accelerate the flow of the primary mixture towards the secondary mixing chamber 102. Accordingly, the contraction zones 215-1 and 215-2 facilitate compression of the primary mixture, thereby compensating the loss of pressure as suffered by the primary mixture during expansion within the expansion zones (205-1, 205-2, 210-1, and 210-2) of the primary mixing chambers

101. The contraction zones 215-1 and 215-2 also facilitate uniform distribution of the hydrocarbon feed droplets throughout the two phase primary mixture. The sharp edges of the arrow shaped dividers 20 II and 201-2 shorten the size of the droplets of the hydrocarbon feed while the primary mixture heads towards the secondary mixing chamber 102. In one implementation and without limiting the scope of the present subject matter, the present assembly 100 may include more than two primary mixing chambers 101 for enhanced mixing of the primary mixture with steam. Corresponding to the this increased number of the primary mixing chambers 101, the present assembly 100 may have more than two steam openings located within the steam inlet 110.

Figure 3A:
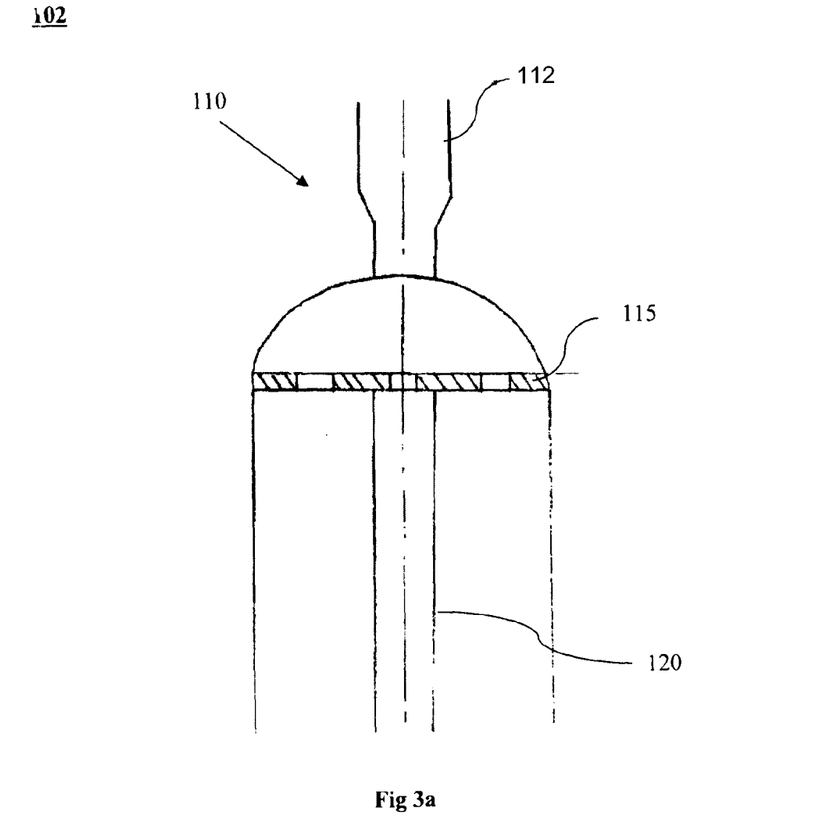
FIG. 3a illustrates a schematic view of a secondary mixing chamber of the feed nozzle assembly of FIG. 1, in one embodiment of the present subject matter.

FIG. 3a illustrates a schematic view of the secondary mixing chamber 102 of the feed nozzle assembly 100 of FIG. 1.

As shown in FIG. 3a, the cylindrical member 120 is located centrally within the secondary mixing chamber 102. By virtue of the curvature of the cylindrical member 120, the outer peripheral surface of the cylindrical member 120 provides a decreased resistance to the flow of the incoming primary mixture from both the primary mixing chambers 101. Accordingly, the primary mixture from the first mixing chamber 101-1 and the second mixing chamber 101-2 encounter the cylindrical member 120 and follow the curvature of the outer peripheral surface of the cylindrical member 120. This prevents sufferance of a high pressure drop by the primary mixture. As mentioned before, the primary mixture streams from the first mixing chamber 101-1 and the second mixing chamber 101-2 tend to undergo collision mixing with each other within the secondary mixing chamber 102.

A hemispherical shaped space above the perforated plate 115 of the steam inlet 110 receives the steam coming from the steam source 112. The hemispherical space facilitates contact of the incoming steam with the perforated plate 115. As shown in FIG. 1 and FIG. 3a, the perforated plate 115 is mounted at the top of the cylindrical member 120 within the secondary mixing chamber 102. Moreover, the cylindrical member 120 acts as a transmitting medium to forward the streams of steam into the tertiary mixing chamber 103.

Figure 3B:
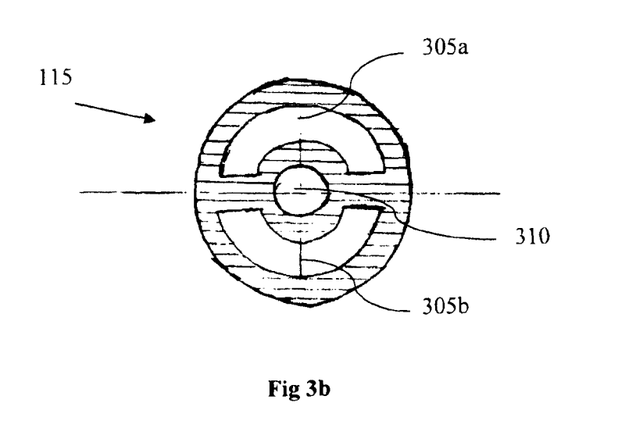
FIG. 3b illustrates a top sectional view of a perforated plate of the secondary mixing chamber of FIG. 2b.

FIG. 3b illustrates a top view of a perforated plate 115 of the secondary mixing chamber 102 of FIG. 2b.

As mentioned before, the steam inlet 110 includes the perforated plate 115 disposed within the secondary mixing chamber 102. As illustrated in FIG. 3b and according to an implementation of the present subject matter, the perforated plate 115 has two semi-circular orifices 30Sa and 30Sb which collectively form the first opening 305 of the steam inlet 110. Similarly, a circular orifice 310 form the second opening of the steam inlet 110. As also mentioned in the description of FIG. 1, the two semi circular orifices 30Sa and 30Sb generate streams of steam for the secondary mixing chamber 102. Similarly, the circular orifice 310 generates streams of steam to be delivered to the tertiary mixing chamber 103 via the cylindrical member 120.

In operation the secondary mixing chamber 102 receives the primary mixture from the primary mixing chambers 101-1 and 101-2, as also explained under the description of FIGS. 2a and 2b. Simultaneously, the streams of steam from the two semi-circular orifices 305a and 305b are introduced into the secondary mixing chamber 102. The streams of steam from the two semi-circular orifices 305a and 305b are aligned to the incoming flow of the primary mixture entering into the secondary mixing chamber 102. Accordingly, the streams of steam impinge on the primary mixture and push it downwards into the secondary mixing chamber 102. The primary mixture undergoes vigorous mixing with the steam within the secondary mixing chamber 102, thereby further atomizing the hydrocarbon feed.

The length of the secondary mixing chamber 102 is enough to enable sufficient expansion of the secondary mixture formed within the secondary mixing chamber 102. Such expansion facilitates intimate mixing of the liquid hydrocarbon feed with the steam. Also, any amount of un-vaporized, sub-cooled water present in the primary mixture gets completely vaporized and mixed with the hydrocarbon feed to form the secondary mixture. The kinetic energy of the continuously incoming streams of steam sweeps the newly formed secondary mixture within the secondary mixing chamber 102 towards the tertiary mixing chamber 103.

Figure 4:
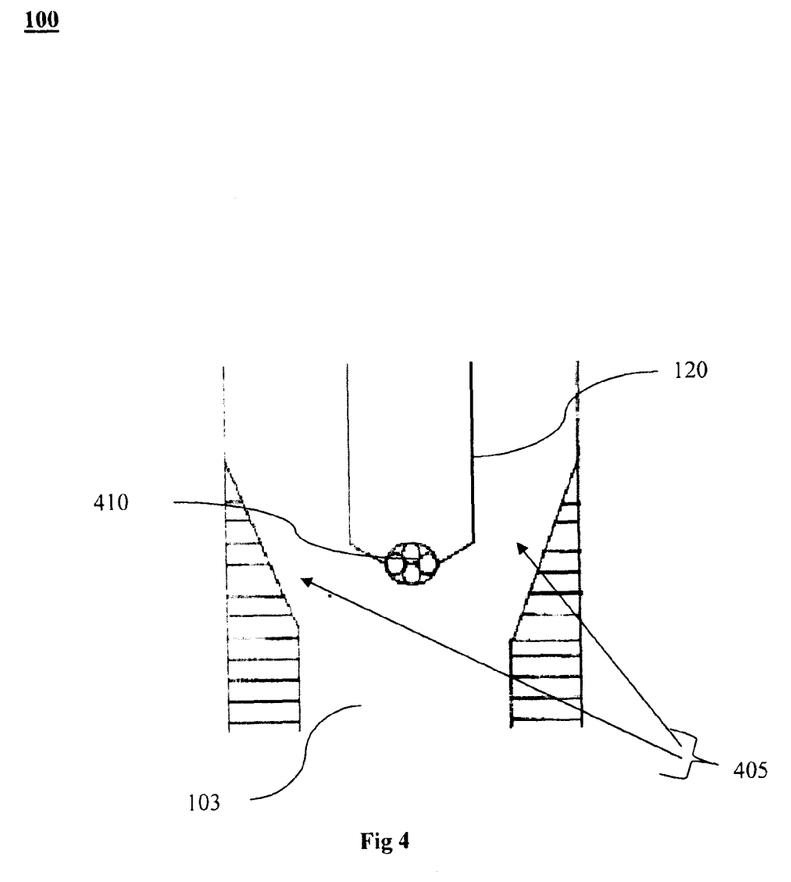
FIG. 4 illustrates a sectional view of a portion of the feed nozzle assembly of FIG. 1, in one embodiment of the present subject matter.

FIG. 4 illustrates sectional view of a portion of the feed nozzle assembly 100 of FIG. 1, thereby depicting the tertiary mixing chamber 103 flow connected to the secondary mixing chamber 102.

As shown in FIG. 4, the tertiary mixing chamber 103 extends from the secondary mixing chamber 102 by a contraction zone 405. The contraction zone 405 is formed as a result of narrowing of the walls, as described in FIG. 1. Accordingly, the secondary mixture while approaching the tertiary mixing chamber 103 from the secondary mixing chamber 102 suffers a decrement in volume. The secondary mixture gets accelerated while advancing towards the tertiary mixing chamber 103, thereby having a high kinetic energy.

Further, a steam sparging means 410 is disposed within the tertiary mixing chamber 103 and flow connected to the cylindrical member 120. The cylindrical member 120 transmits the streams of steam coming from the second opening 310 of the perforated plate 115 to the tertiary mixing chamber 103. Accordingly, the steam sparging 410 means facilitates a shower of the streams of steam with high kinetic energy into the tertiary mixing chamber 103.

The secondary mixture at a high speed arrives into the tertiary mixing chamber 103. In addition, the streams of steam is also sparged into the tertiary mixing chamber 103 from the sparging means 410 also at a high speed. In one implementation, the kinetic energy of the streams of steam sparged inside the tertiary mixing chamber 103 is higher than the kinetic energy of the streams of steam injected into the secondary mixing chamber 102. By virtue of kinetic energies, the secondary mixture and the streams of steam undergo a vigorous collision mixing in the tertiary mixing chamber 103.

In the tertiary mixing chamber, an extent of the vigorousness obtained in the mixing is high as compared to the primary mixing chambers 101 and the secondary mixing chamber 102. The resultant mixture so obtained in the tertiary mixing chamber 103 is the most turbulent mixture as compared to the primary mixture and the secondary mixture. The resultant mixture may be referred as the tertiary mixture. Accordingly, the extent of atomization in the tertiary mixing chamber 103 is higher as compared to the atomization in the primary mixing chambers 101-1 and 101-2 and the secondary mixing chamber 102.

Figure 5A:
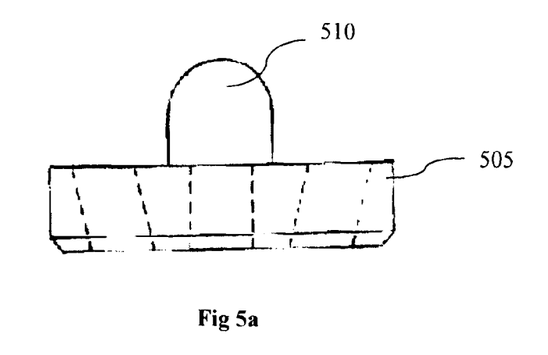
FIG. 5a illustrates a front view of a flow diverter of the feed nozzle assembly of FIG. 1, in one embodiment of the present subject matter.

FIG. 5a illustrates a front view of a flow diverter 125 of the feed nozzle assembly 100 of FIG. 1, in one embodiment of the present subject matter. In one embodiment, the flow diverter 125 has a cylindrical base 505 and a cylindrical block 510 with a spherical top surface mounted on the cylindrical base 505. The cylindrical block 510 is mounted axially over the cylindrical base 505 and extends vertically from the base 505. In one embodiment of the present subject matter, the flow diverter 125 may have a conical block, instead of the cylindrical block 510 such that the conical block may be mounted on the cylindrical base 505.

Figure 5B:
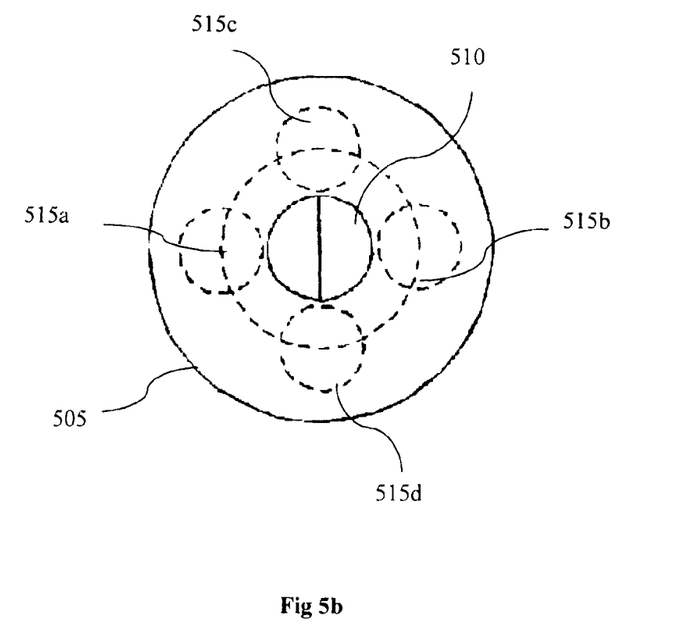
FIG. 5b illustrates atop sectional view of the flow diverter of Fig Sa, In one embodiment of the present subject matter.

FIG. 5b illustrates a top sectional view of the flow diverter 125, in accordance with one embodiment. As aforementioned with respect to the description of FIG. 1, the flow diverter 125 is disposed within the tertiary mixing chamber 103 at the beginning of the nozzle tip region 122. As mentioned under the description of FIG. 1, the nozzle tip region 122 is included within the tertiary mixing chamber 103 and acts as an extension thereof. The cylindrical base 505 of the flow diverter 125 has four diverter orifices 515a, 515b, 515c and 515d. These orifices may be herein referred to as the diverter orifices 515. The diverter orifices 515 that extend downwardly along a longitudinal axis of the cylindrical base 505. The diverter orifices 515 are angularly directed towards the nozzle orifice 130 disposed in the nozzle tip region 122. Without limiting the scope of the present subject matter, the flow diverter 125 of the present assembly 100 may have more than two diverter orifices.

In operation, the flow diverter 125 receives the tertiary mixture which is highly pressurized and turbulent in nature. The tertiary mixture impinges upon the spherical top of the cylindrical block 510 and slides along the walls of the cylindrical block 510. By virtue of this geometry of the cylindrical block 510, the flow of the tertiary mixture is swiftly guided to the diverter orifices SIS. In addition, the cylindrical block 510 ensures a low pressure drop suffered by the tertiary mixture on encountering the flow diverter 125.

As aforementioned, the cylindrical block 510 guides the incoming tertiary mixture towards the diverter orifices 515. The diverter orifices 515 divide the tertiary mixture into a number of tertiary mixture streams. The tertiary mixture streams so produced are further directed by the diverter orifices SIS to the nozzle orifice 130 provided within the nozzle tip region 122 of the present assembly 100.

In one embodiment, the diverter orifices 515 may also direct the tertiary mixture streams to more than one nozzle orifice 130 that may be located at different elevations within the nozzle tip region 122 of the feed nozzle assembly 100. In addition, the flow diverter 125 facilitates stabilization of the tertiary mixture streams introduced into the nozzle tip region 122 by maintaining the low pressure drop.

Figure 6A:
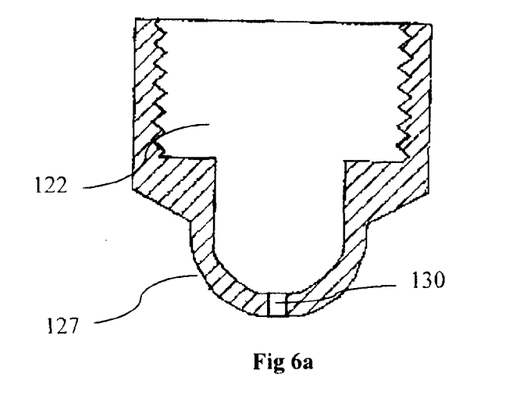
FIG. 6a illustrates a schematic view of a the tertiary mixing chamber of the feed nozzle assembly of FIG. 1, in one embodiment of the present subject matter.

FIG. 6a illustrates a schematic view of the tertiary mixing chamber 103 of the feed nozzle assembly 109 of FIG. 1, in one embodiment of the present subject matter; thereby depicting the nozzle tip region 122.

Figure 6B:
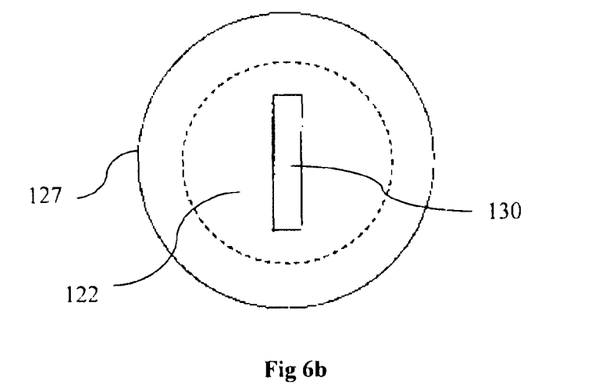
FIG. 6b illustrates a bottom view of the tertiary mixing chamber of the feed nozzle assembly of FIG. 1, in one embodiment of the present subject matter.

FIG. 6b illustrates a bottom view of the tertiary mixing chamber 103 of the feed nozzle assembly 100 of FIG. 1, in one embodiment of the present subject matter, thereby depicting a bottom view of the nozzle tip region 122.

As depicted by FIGS. 6a and 6b, in one of the embodiment, the feed nozzle assembly 100 has a nozzle orifice 130 disposed at the boundary 127 of the nozzle tip region 122. Specifically, the nozzle orifice 130 is an opening provided on the boundary 127 in the shape of a slot, as depicted by FIG. 6b.

In operation, the nozzle orifice 130 receive tertiary mixture streams from the flow diverter 125. An emergence of the tertiary mixture streams out of the nozzle orifice 130 at a very high velocity individually atomizes the tertiary mixture streams. Specifically, the high velocity of the outgoing tertiary streams shortens the size of droplets of the liquid hydrocarbon feed present within the tertiary mixture streams.

The nozzle orifice 130 acts as a gateway to lead the atomized tertiary mixture streams out of the feed nozzle assembly 100. As mentioned before, the nozzle orifice 130 is in the form of the slot. In one embodiment, the nozzle orifice 130 may be in the form a cylindrical notch. By virtue of the aforementioned geometrical design of the nozzle orifice 130, the outgoing and individually atomized tertiary mixture streams from the nozzle orifice 130 reinforce in one another to produce the flat fan shaped spray. The spray includes of a finely atomized droplets of the liquid hydrocarbon feed. In addition, the angle of the flat fan spray so produced depends upon a slot angle of the nozzle orifice 130. In one implementation, the slot angle of the nozzle orifice 130 is such that a flat fan spray having the spray angle between 60 degrees to 120 degrees is produced. This range of angle may be sufficient for the flat fan spray to cover the entire cross-section of a riser reactor.

The spray so produced has all hydrocarbon feed droplets of identical diameter and uniformly distributed throughout the spray cross-section. In one implementation, a sauter mean diameter of the droplet within the atomized liquid hydrocarbon feed is achieved as 85200 microns. In addition, a velocity attained by these droplets may lie in the range of 25-60 mlsec which is conducive enough for the droplets to penetrate sufficiently into a catalyst bed inside a riser reactor. However, as understood by a person of ordinary skill in the art, various parameters governing the production of the droplets may be varied to obtain the sauter mean diameter in the range of 50 microns to 150 microns and the mean velocity in the range of 20 m/sec to 100 mlsec.

In one embodiment of the present subject matter, there may me more than one nozzle orifice 130 that may be disposed at various elevations within the nozzle tip region 122. These multiple nozzle orifices 130 may be disposed at different elevations within the nozzle tip region 122 of the feed nozzle assembly 100 to produce a number of flat fan sprays. In such case, the nozzle orifices 130 may be disposed within the nozzle tip region 122 at various angles to one another for converging the multiple flat fan sprays on a single plane with or without overlapping to produce more uniformity in the droplet size and the droplet velocity distribution on the single plane.

In one embodiment of the present subject matter, the feed nozzle assembly 100 may be placed within the riser reactor at angle between 60 degrees and 90 degrees to the horizontal.

EXPERIMENTS

The feed nozzle as depicted in FIG. 1 has been used for experimentation. The effectiveness of the feed nozzle assembly 100 has been determined by conducting experiments under various conditions. During conduction of the experiments, the feed nozzle assembly 100 may not be coupled to a riser reactor. These experiments have been conducted by using mixtures of air, water and nitrogen mixtures and employing a standard test procedure. As known in the existing art, such procedure is employed to predict the performance of a conventional feed nozzle assembly.

As known in the art, there exists a predetermined relationship between the properties exhibited by of the water/air/nitrogen mixture and the hydrocarbon feed/steam/subcooled water mixture employed during an actual operation of the feed nozzle assembly 100. In addition, the relative amounts of the steam as an atomizing media and the hydrocarbon feed are numerically similar to the relative amounts of air and water. As an example, the feed nozzle assembly 100 discharging a 5,000 BPD of the hydrocarbon and 2 wt, % atomizing steam will generate about the same spray pattern as the same feed nozzle assembly discharging the same weight per hour of water, with 2 wt. % air.

Further, the experimental set up includes the feed nozzle assembly 100 oriented vertically downward within the riser reactor. A phase doppler particle analyzer which works on Bragg's principle has been used for measurement of a droplet size and a mean velocity of the atomized droplets of the liquid hydrocarbon feed. The droplet size reported here is Saute, Mean Diameter (SMD), which may be defined as the diameter of a sphere which has the same volume to surface ratio as that of the droplet produced by the feed nozzle assembly 100.

The experiments have been conducted by varying air and nitrogen rate as well as nitrogen gas pressure, while keeping an air pressure constant. In addition, a water flow rate is also kept constant during the experiments. In accordance with the aforementioned experimental set up. Table I describes an effect of air and nitrogen rate on the sauter mean diameter SMD and the mean velocity of the atomized droplets for a particular value of the air pressure and the nitrogen gas pressure. Whereas, Table 2 describes the same effect by maintaining the same air pressure and varying the nitrogen gas pressure.

TABLE 1

Air pressure = 6.0 kg/cm$^2$
Nz pressure = 5.0 kg/cm$^2$

| Water rate (kg/hr) | Air rate (kg/hr) | N$_2$ rate (kg/hr) | SMD (um) | Mean velocity (m/s) |
|---|---|---|---|---|
| 1994 | 17.5 | 28.5 | 402 | 26.90 |
| 1994 | 20.5 | 28.5 | 389 | 30.00 |
| 1994 | 24 | 28.5 | 306 | 33.60 |
| 1994 | 26 | 39 | 237 | 37.60 |
| 1994 | 30.5 | 39 | 203 | 39.90 |
| 1994 | 46 | 39 | 161 | 44.50 |
| 1994 | 49 | 67.5 | 134 | 47.00 |
| 1994 | 54 | 67.5 | 128 | 47.90 |

TABLE 2

Air pressure = 6.0 kg/cm$^2$
N2 pressure = 6.0 kg/cm$^2$

| Water rate (kg/hr) | rate | Air rate (kg/hr) | N$_2$ rate (kg/hr) | SMD (um) | Mean Velocity (m/s) |
|---|---|---|---|---|---|
| 1994 | | 6.7 | 71 | 261 | 32.60 |
| 1994 | | 14.5 | 71 | 223 | 37.00 |
| 1994 | | 17.5 | 85 | 190 | 38.66 |
| 1994 | | 24 | 85 | 139 | 45.75 |
| 1994 | | 29.5 | 106.5 | 120 | 48.67 |
| 1994 | | 34.5 | 106.5 | 107 | 51.17 |
| 1994 | | 40 | 128 | 97 | 54.68 |
| 1994 | | 45.5 | 128 | 92 | 5788 |

As it is clear from the aforementioned experimental tables, the present nozzle feed assembly 100 is operable to achieve the sauter mean diameter of the droplets lying in the range of 85 micron to 200 micron. In addition, the mean velocity attained by these droplets may lie in the range of 25-60 mlsec. Such parameters are found to be conducive enough for the droplets to penetrate sufficiently into a catalyst bed inside the riser reactor.

The aforementioned experimental examples are put forth so as to provide those of ordinary skill in the art with a complete disclosure and the description of how to make and use the present invention, and are not intended to limit the scope of what the inventors regard as there invention nor are they intended to represent that the experiments mentioned above are all and only experiments performed.

The previously described versions of the subject matter and its equivalent thereof have many advantages, including those which are described herein.

The feed nozzle assembly 100 described by the present subject matter atomizes all forms of the liquid hydrocarbon feed that have high viscosity and surface tension, with an ease of operation. As an example, the present feed assembly 100 efficiently atomizes the hydrocarbon feed having a rating of about 24 weight percent conradson carbon residue (CCR) as compared to the conventional atomizers that can atomize feed having a rating up to 10 weight percent conradson carbon residue The efficient atomization achieved by the present assembly 100 may be attributed to the aforementioned multi-stage mixing of the hydrocarbon feed with the atomizing media at multiple chambers. Accordingly, the present feed nozzle assembly 100 facilitates formation of finely atomized droplets of the liquid hydrocarbon feed.

These finely atomized when introduced into a riser reactor undergo complete vaporization at a very fast rate. Accordingly, the catalytic cracking of the liquid hydrocarbon feed also proceeds effectively at a fast rate. Thus, the present feed assembly 100 subordinates the riser reactor in achieving an increased hydrocarbon yield with time efficiency.

Further, the present assembly 100 operates with a low pressure drop. Accordingly, the present assembly 100 prevents a requirement of highly pressurized liquid hydrocarbon supply. Due to this, the operating cost and capital equipment required to pump the input liquid hydrocarbon feed at high pressure are reduced. Moreover, the sufferance of low pressure drop by the liquid hydrocarbon feed while proceeding inside the feed nozzle assembly 100 facilitates maintenance of an optimum pressure needed to sufficiently atomize the liquid hydrocarbon feed.

Although the subject matter has been described in considerable detail with reference to certain preferred embodiments thereof, other embodiments are possible. As such, the spirit and scope of the appended claims should not be limited to the description of the preferred embodiment contained therein

We claim:

1. A feed nozzle assembly comprising:
    at least one primary mixing chamber to receive a liquid hydrocarbon and a diluent to produce a primary mixture;
    a secondary mixing chamber flow connected to the primary mixing chamber to receive the primary mixture;
    a tertiary mixing chamber forming part of the feed nozzle assembly and being flow connected to the secondary mixing chamber; and
    a steam inlet that includes:
        a first opening located at about one end of the secondary mixing chamber to inject first streams of steam into the secondary mixing chamber;
        a second opening formed by a cylindrical member coupled to the steam inlet, said second opening being located at about the tertiary mixing chamber to inject second streams of steam into the tertiary mixing chamber; and
        a perforated plate disposed in the secondary mixing chamber to receive steam, wherein:
            the perforated plate further includes a first set of orifices and a second set of orifices, the first set of orifices and the second set of orifices dividing the steam into the first streams of steam and the second streams of steam, the first set of orifices acting as the first opening and injecting the first streams of steam into the secondary mixing chamber; and the cylindrical member is coupled to the second set of orifices to receive the second streams of steam from the second set of orifices.

2. The feed nozzle assembly as claimed in claim 1, wherein the cylindrical member comprises a sparging means to inject streams of steam into the tertiary mixing chamber.

3. A process for atomizing a liquid comprising:

injecting a quantity of a diluent and a liquid hydrocarbon feed into a primary mixing chamber to form a primary mixture;

introducing the primary mixture and a first streams of steam into a secondary mixing chamber forming part of a feed nozzle assembly to generate a secondary mixture wherein said first streams of steam is introduced in the secondary mixing chamber by means of a first opening provided in a steam inlet; and directing the secondary mixture and a second streams of steam into a tertiary mixing chamber forming part of the feed nozzle assembly to generate a tertiary mixture wherein said second streams of steam is introduced in the tertiary mixing chamber by means of a second opening provided in the steam inlet.

4. The process as claimed in claim 3, wherein the directing the secondary mixture comprises pressurizing the secondary mixture by the injecting of the streams of steam into the secondary mixing chamber to move the secondary mixture into the tertiary mixing chamber.

5. The process as claimed in claim 3, further comprising:

dividing the tertiary mixture into a plurality of tertiary mixture streams; and directing the plurality of tertiary mixture streams to a plurality of nozzle orifices provided in a nozzle tip region and stabilizing the plurality of tertiary mixture streams within the nozzle tip region to produce a spray comprising a plurality of droplets of the liquid hydrocarbon feed.

6. The process as claimed in claim 3, wherein the plurality of droplets of the liquid hydrocarbon feed has a droplet size of about 85 microns to 200 microns.

* * * * *